(12) United States Patent
Kida

(10) Patent No.: US 11,120,533 B2
(45) Date of Patent: Sep. 14, 2021

(54) INFORMATION PROCESSING METHOD AND INFORMATION PROCESSING APPARATUS

(71) Applicant: Roland Corporation, Shizuoka (JP)

(72) Inventor: Atsushi Kida, Shizuoka (JP)

(73) Assignee: Roland Corporation, Shizuoka (JP)

( * ) Notice: Subject to any disclaimer, the term of this patent is extended or adjusted under 35 U.S.C. 154(b) by 69 days.

(21) Appl. No.: 16/509,471

(22) Filed: Jul. 11, 2019

(65) Prior Publication Data
US 2020/0020086 A1    Jan. 16, 2020

(30) Foreign Application Priority Data
Jul. 13, 2018 (JP) ............................... JP2018-133295

(51) Int. Cl.
| | | |
|---|---|---|
| *G06T 5/50* | (2006.01) | |
| *G06T 7/194* | (2017.01) | |
| *H04N 9/31* | (2006.01) | |
| *H04N 5/235* | (2006.01) | |
| *H04N 5/232* | (2006.01) | |

(52) U.S. Cl.
CPC ............... *G06T 5/50* (2013.01); *G06T 7/194* (2017.01); *H04N 5/2351* (2013.01); *H04N 5/2353* (2013.01); *H04N 5/232121* (2018.08); *H04N 9/3182* (2013.01)

(58) Field of Classification Search
None
See application file for complete search history.

(56) References Cited

U.S. PATENT DOCUMENTS

2013/0028517 A1* 1/2013 Yoo .................... G06K 9/00375
382/173
2019/0102886 A1* 4/2019 Guigues .................... G06T 7/90

FOREIGN PATENT DOCUMENTS

| JP | 5782871 | 9/2015 |
| JP | 6076623 | 2/2017 |

\* cited by examiner

*Primary Examiner* — Leon Flores
(74) *Attorney, Agent, or Firm* — JCIPRNET (57) ABSTRACT

An information processing method includes: acquiring fixed values which are imaging conditions of a first image formed in a state in which a background and a predetermined subject located in front of the background are within an imaging visual field, from the first image; acquiring a learning image as background learning data, wherein the learning image is captured using the fixed values in a second image formed in a state in which the subject is outside of the imaging visual field; extracting a difference image between the background learning data and an input image obtained by capturing the first image using the fixed values; and generating a combined image obtained by combining the difference image with a combination background image.

17 Claims, 10 Drawing Sheets

INFORMATION PROCESSING METHOD AND INFORMATION PROCESSING APPARATUS

CROSS-REFERENCE TO RELATED APPLICATION

This application claims the priority of Japan patent application serial no. 2018-133295, filed on Jul. 13, 2018. The entirety of the above-mentioned patent application is hereby incorporated by reference herein and made a part of this specification.

BACKGROUND

Technical Field

The disclosure relates to an information processing method and an information processing apparatus.

Description of Related Art

As one of the subject detection methods of detecting subjects from images, there is a background difference method. In the background difference method, a background image with no a detection target subject is prepared, a difference between pixel values of the background image and an input image is calculated, and a subject in the input image is detected based on a calculation result. The detected subject is combined with another background image.

PATENT DOCUMENTS

[Patent Document 1] Japanese Patent No. 5782871
[Patent Document 2] Japanese Patent No. 6076623

SUMMARY

According to an embodiment of the disclosure, there is provided an information processing method performed by an information processing apparatus, the method including: acquiring fixed values which are imaging conditions of a first image formed in a state in which a background and a predetermined subject located in front of the background are within an imaging visual field, from the first image; acquiring a learning image as background learning data, wherein the learning image is captured using the fixed values in a second image formed in a state in which the subject is outside of the imaging visual field; extracting a difference image between the background learning data and an input image obtained by capturing the first image using the fixed values; and generating a combined image obtained by combining the difference image with a combination background image.

According to another embodiment of the disclosure, there is provided an information processing apparatus including a control part configured to perform: a process of acquiring fixed values which are imaging conditions of a first image formed in a state in which a background and a predetermined subject are located in front of the background within an imaging visual field, from the first image; a process of acquiring a learning image as background learning data, wherein the learning image is captured using the fixed values in a second image formed in a state in which the subject is outside of the imaging visual field; a process of extracting a difference image between the background learning data and an input image obtained by capturing the first image using the fixed values; and a process of generating a combined image obtained by combining the difference image with a combination background image.

According to still another embodiment of the disclosure, there is provided a non-transitory computer readable medium that stores a program causing a computer to perform: a step of acquiring fixed values which are imaging conditions of a first image formed in a state in which a background and a predetermined subject located in front of the background are within an imaging visual field, from the first image; a step of acquiring a learning image as background learning data, wherein the learning image is captured using the fixed values in a second image formed in a state in which the subject is outside of the imaging visual field; a step of extracting a difference image between the background learning data and an input image obtained by capturing the first image using the fixed values; and a step of generating a combined image obtained by combining the difference image with a combination background image.

DESCRIPTION OF THE EMBODIMENTS

Hereinafter, an information processing apparatus and an information processing method according to an embodiment will be described with reference to the drawings. The configuration of the information processing apparatus according to the embodiment is exemplary and the disclosure is not limited to the configuration. In the embodiment, an information processing method and an information processing device that perform a process of extracting subjects (people, animals, plants, objects, and the like) in front of a background using the background difference method and combining the subjects with another background (difference detection key combination) will be described.

<Configuration of Information Processing Apparatus>

Figure 1:
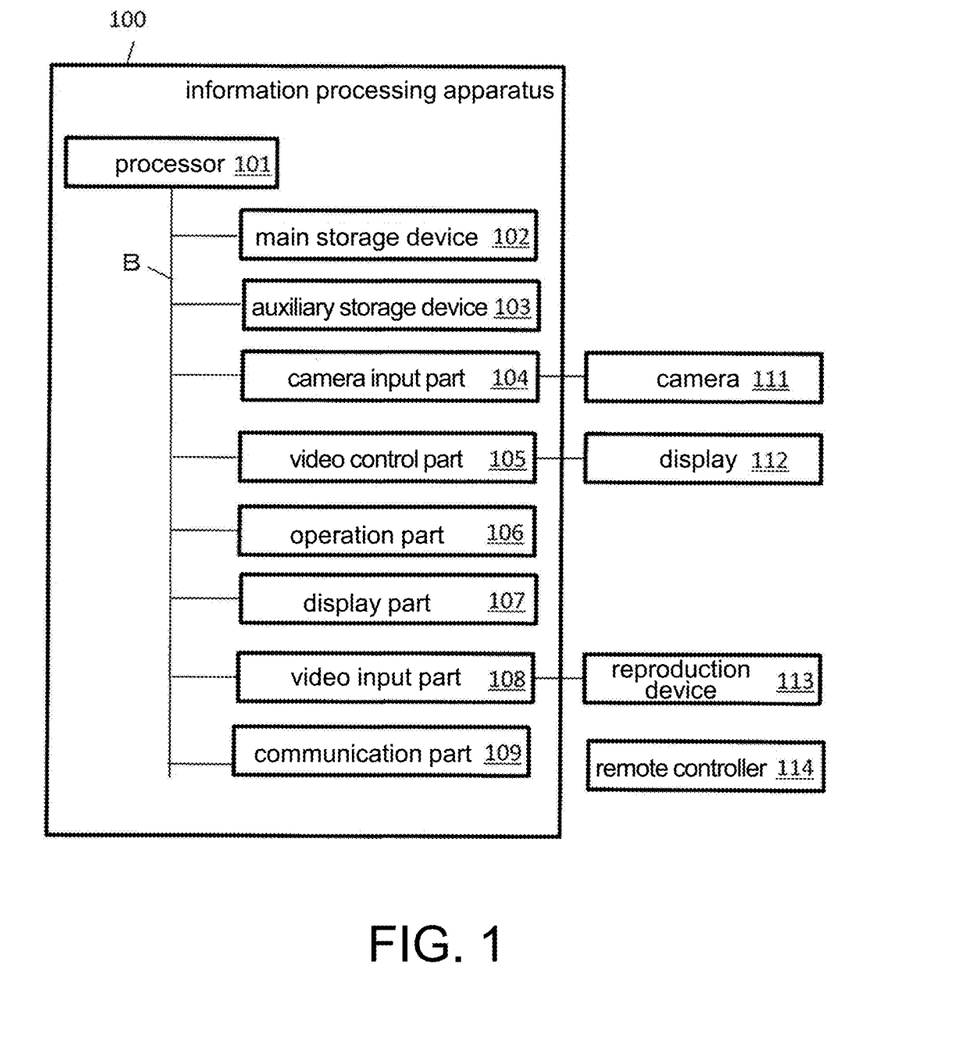
FIG. 1 is a diagram illustrating a configuration example of an information processing apparatus according to an embodiment.

FIG. 1 is a diagram illustrating a configuration example of an information processing apparatus 100 according to an embodiment. A dedicated or general computer such as a personal computer, a workstation, a server machine, a smart apparatus (a smartphone or a tablet terminal), a feature phone, or a personal digital assistant (PDA) can be applied to the information processing apparatus 100. The computer may not be portable. The computer may not have a communication function. The information processing apparatus 100 is, for example, a smartphone with a camera in which an application program for image combination (referred to as an image combination application) is installed.

In the example illustrated in FIG. 1, the information processing apparatus 100 includes a processor 101, a main storage device 102, and an auxiliary storage device 103 connected via a bus B. The information processing apparatus 100 further includes a camera input part 104, a video control part 105, an operation part 106, a display part 107, a video input part 108, and a communication part 109.

The camera 111 is connected to the camera input part 104 and the display 112 is connected to the video control part 105. A video reproduction device 113 is connected to the video input part 108. The communication part 109 can communicate with the remote controller 114.

The main storage device 102 includes a read-only memory (ROM) and a random access memory (RAM). The ROM stores a program that is executed by the processor 101 or data that is used when the program is executed. The RAM is used as a program loading area, a data storage area, a working area of the processor 101, a buffer area of communication data, or the like.

The auxiliary storage device 103 is used as a storage area of data or a program. The auxiliary storage device 103 is, for example, a hard disk, a solid-state drive (SSD), an EEPROM, or a flash memory.

The camera input part 104 is an interface circuit connected to the camera 111. The camera input part 104 performs a process of receiving an input for image data captured by the camera 111 and delivering the image data to the processor 101 or storing the image data in the main storage device 102 or the auxiliary storage device 103 (when both the main storage device 102 and the auxiliary storage device 103 are not distinguished from each other, the main storage device 102 and the auxiliary storage device 103 are referred to as "storage devices").

The video control part 105 is formed as an integrated circuit such as a GPU, a field programmable gate array (FPGA), or an application specific integrated circuit (ASIC). The video control part 105 includes a video RAM and performs processes of drawing images (frames) displayed on the display 112 on the video RAM at a predetermined frame rate and outputting the images to the display 112. Thus, a video (including a moving image and a still image) drawn by the video control part 105 is displayed on the display 112.

The operation part 106 is an input device such as a key, a button, a pointing device (a mouse or the like), or a touch panel and is used to input information or data, an operation instruction, or the like. The display part 107 is a display device that is used to display data or information. The display part 107 is a built-in display of the information processing apparatus 100 and the display 112 is an externally attached display. One of the display part 107 and the display 112 may be omitted.

The video reproduction device 113 performs a process of reproducing a predetermined moving image file (AVI, WMV, FLV, MP4, or the like). The video data generated through the reproduction process is input to the video input part 108. The video input part 108 is an interface circuit of the reproduction device 113 and performs, for example, a process of transmitting the video data to the processor 101 or the video control part 105. The communication part 109 is a communication interface circuit that performs communication in conformity with a predetermined communication standard and includes a LAN card, a radio communication module, and an infrared communication module.

The processor 101 is, for example, a central processing unit (CPU) and is equivalent to a control part. The processor 101 performs various processes by executing programs stored in the storage device. The processes performed by the processor 101 may be performed by a plurality of CPUs (processors) or may be performed by a CPU that has a multi-core configuration. The processes performed by the processor 101 may be performed by a processor (DSP, GPU, or the like) other than a CPU, an integrated circuit (ASIC, FPGA, or the like) other than the processor, or a combination (MPU, SoC, or the like) of the processor and the integrated circuit.

<Overview of Process>

Next, an overview of a process performed by the processor 101 will be described. FIGS. 2 to 5 are explanatory diagrams illustrating processes performed by the information processing apparatus 100. The processor 101 of the information processing apparatus 100 photographs an image in which a subject is in front of a background (referred to as a camera image (an image for acquiring fixed values) 20A) within a photographing visual field of the camera 111 using the camera 111 disposed in a fixed manner (see FIG. 2(A)). In the example illustrated in FIG. 2(A), the camera image 20A is an image in which a person 11 is located as a subject in front of a background formed by a sofa 12, a wall 13, and a window 14. The person 11 may be, for example, a user of the information processing apparatus 100, but may be another person. The subject other than a person may be an animal, a plant, or an object.

Figure 2:
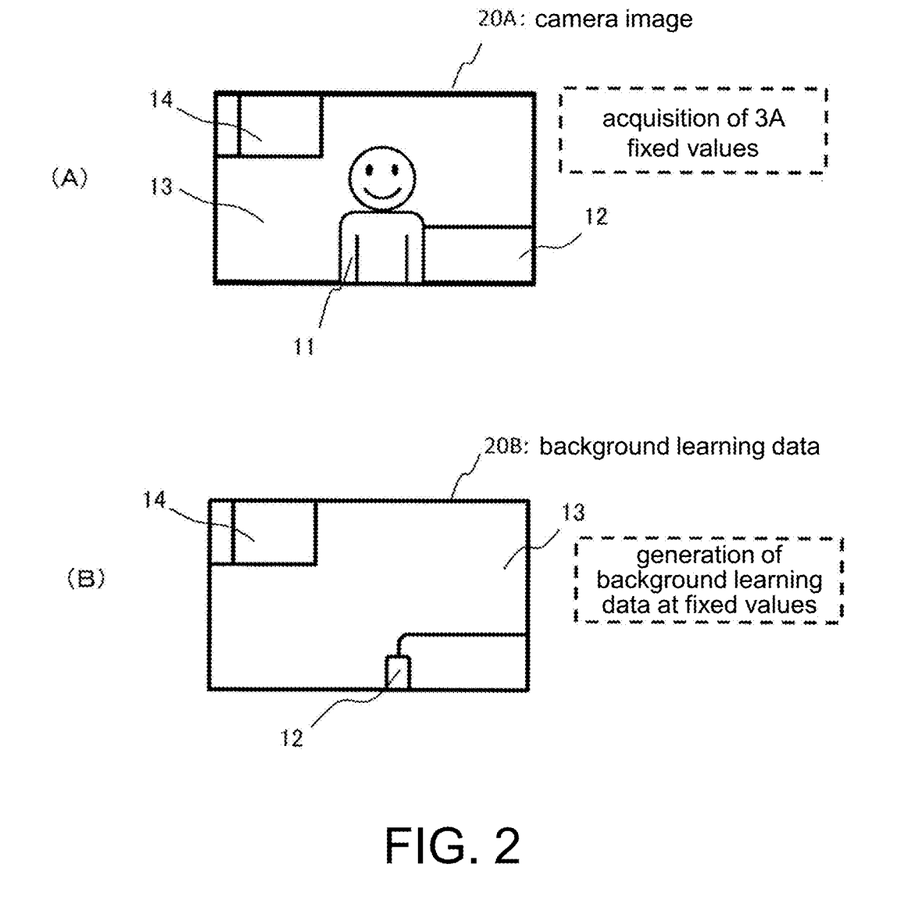
FIG. 2 is an explanatory diagram illustrating a process performed by the information processing apparatus.

The processor 101 performs an automatic exposure (AE) process, an autofocus (AF) process, an auto-white balance (AWB) process (hereinafter referred to as 3A processes) on the camera image 20A and fixes an AE value, an AF value, and an AWB value (referred to as 3A values when these values are collectively indicated). The fixed 3A values are referred to as "fixed values."

The AE process is a process of controlling an iris (lens diaphragm) included in the camera 111, a gain of an image sensor (imaging element) included in the camera 111, and a shutter speed based on luminance information of an imaging visual field and maintaining brightness of an image constantly. The AF process is a process of adjusting a focus position in accordance with contrast information or phase difference information. The AWB process is normally a process of approaching an average color within a screen to gray. The human sense of vision is chromatically adapted. Therefore, even when illumination light is changed, human beings can feel the original color of a subject. However, since the image sensor and the human sense of vision have different spectral characteristics, the image sensor does not have a function of color adaptation. Therefore, a bias occurs in the color depending on illumination light. A process of correcting the bias is an AWB process.

For example, a user of the information processing apparatus 100 can set a timer for controlling a timing at which the 3A processes are performed. When the timer is set, the processor 101 starts the 3A processes using an expiration of the timer as a trigger. When the AE value, the AF value, and the AWB value are optimum values, the processor 101 acquires these values as fixed values and stores these values in the storage device. Here, the user can designate at least one of the AE value, the AF value, and the AWB value obtained as the fixed values and adjust the designated value using the remote controller 114. The processor 101 stores the AE value, the AF value, or the AWB value updated through the adjustment by the user as the fixed values in the storage device. Adjusting exposure, focus, and white balance may be performed manually and each value may be obtained as a fixed value.

Next, the processor 101 generates background learning data using the fixed values (see FIG. 2(B)). As illustrated in FIG. 2(B), in a state in which the AE value, the AF value, and the AWB value are the fixed values, the processor 101 prompts the user to capture an image (learning image) in which the person 11 who is a foreground subject is outside from the imaging visual field of the camera 111 and to capture a learning image. The processor 101 stores a value corresponding to each pixel that forms the learning image as background learning data in the storage device.

Constituent elements of the pixels may be expressed with YCbCr (YUV) rather than RGB. Y represents luminance, Cb represents hue and saturation of each color of blue shades, and Cr represents hue and saturation of each color of red shades. In difference extraction, when YCbCr is determined, a threshold can be separately set for luminance and tone. Therefore, extraction precision is further improved than when RGB is used.

Figure 3:
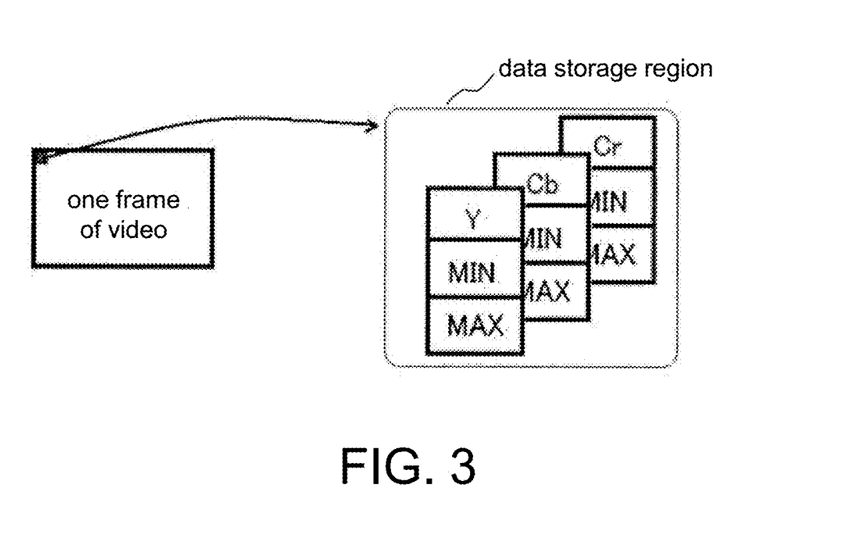
FIG. 3 is an explanatory diagram illustrating a process performed by the information processing apparatus.

FIG. 3 is an explanatory diagram illustrating background learning data. In FIG. 3, a configuration of each pixel of one frame (equivalent to a still image) of a video is illustrated. The background learning data is, for example, a set of background data corresponding to the pixels. The background data is a set of data related to components Y, Cb, and Cr (8 bits and a resolution of 0 to 255) of the pixels and is stored in a data storage region (referred to as a BOX) prepared for the pixels. In the case of 1280×720 pixels, the number of pixels is 921,600. Since the background data is data of Y, Cb, and Cr for each pixel, the total number of pieces of data of Y, Cb, and Cr is 2,764,800. Each of the data of Y, Cb, and Cr has MIN which is a minimum threshold and MAX which is a maximum threshold.

For antinoise measures, the background data is generated for each pixel from data of a plurality of frames equivalent to several seconds and, for example, background data of a pixel at coordinates (x, y)=(1, 1) is stored in a format of Y (luminance) with MIN=100 and MAX=120, Cb (blue difference) with MIN=60 and MAX=62, and Cr (red difference) with MIN=110 and MAX=112. Background learning data 20B is used for a process of extracting a difference image (background subject).

Figure 4:
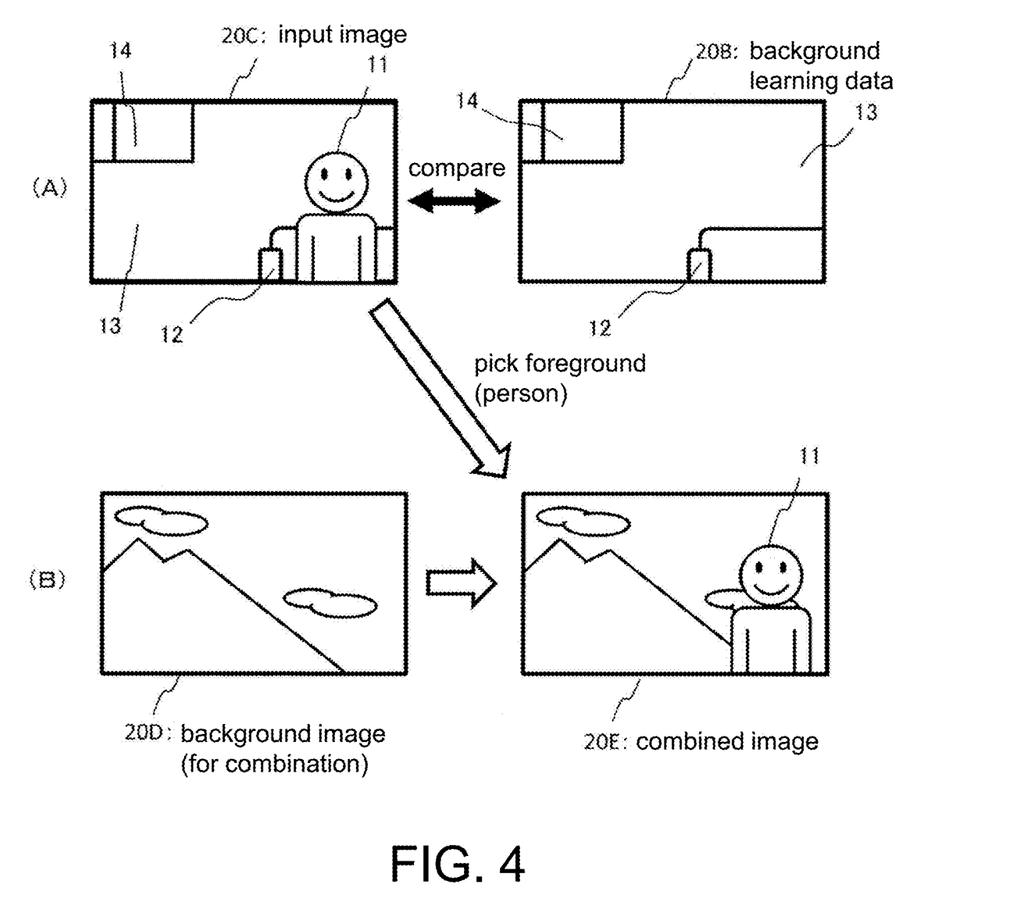
FIG. 4 is an explanatory diagram illustrating a process performed by the information processing device.

After the background learning data is generated, as illustrated in FIG. 4(A), it is assumed that an input image 20C is obtained through imaging of the camera 111. The input image 20C is an image obtained with the camera 111 by imaging the same visual field range as the imaging visual field of the camera image 20A. In the example illustrated in FIG. 4(A), the person 11 is shown as an example of a subject in the foreground. In the imaging of the input image 20C, the foregoing fixed values are used. The processor 101 contrasts pixel values (values of Y, Cb, and Cr) of the input image 20C with the background learning data 20B and performs a process of extracting the foreground subject (the person 11).

That is, when each pixel value of the input image 20C falls within a range of the maximum threshold and the minimum threshold indicated by the background data of corresponding pixels in the background learning data, the processor 101 determines that the pixels are the background. Conversely, when each pixel value does not fall within the range, the processor 101 determines that the pixels are the foreground subject (the person 11). The processor 101 extracts the foreground subject (the person 11) from the input image 20C by performing this process on all the pixels. The processor 101 generates a key mask 30 using an extraction result.

The processor 101 obtains a background image 20D for combination illustrated in FIG. 4(B). For example, the processor 101 can obtain data of the background image 20D input from the reproduction device 113 via the video input part 108.

Figure 5:
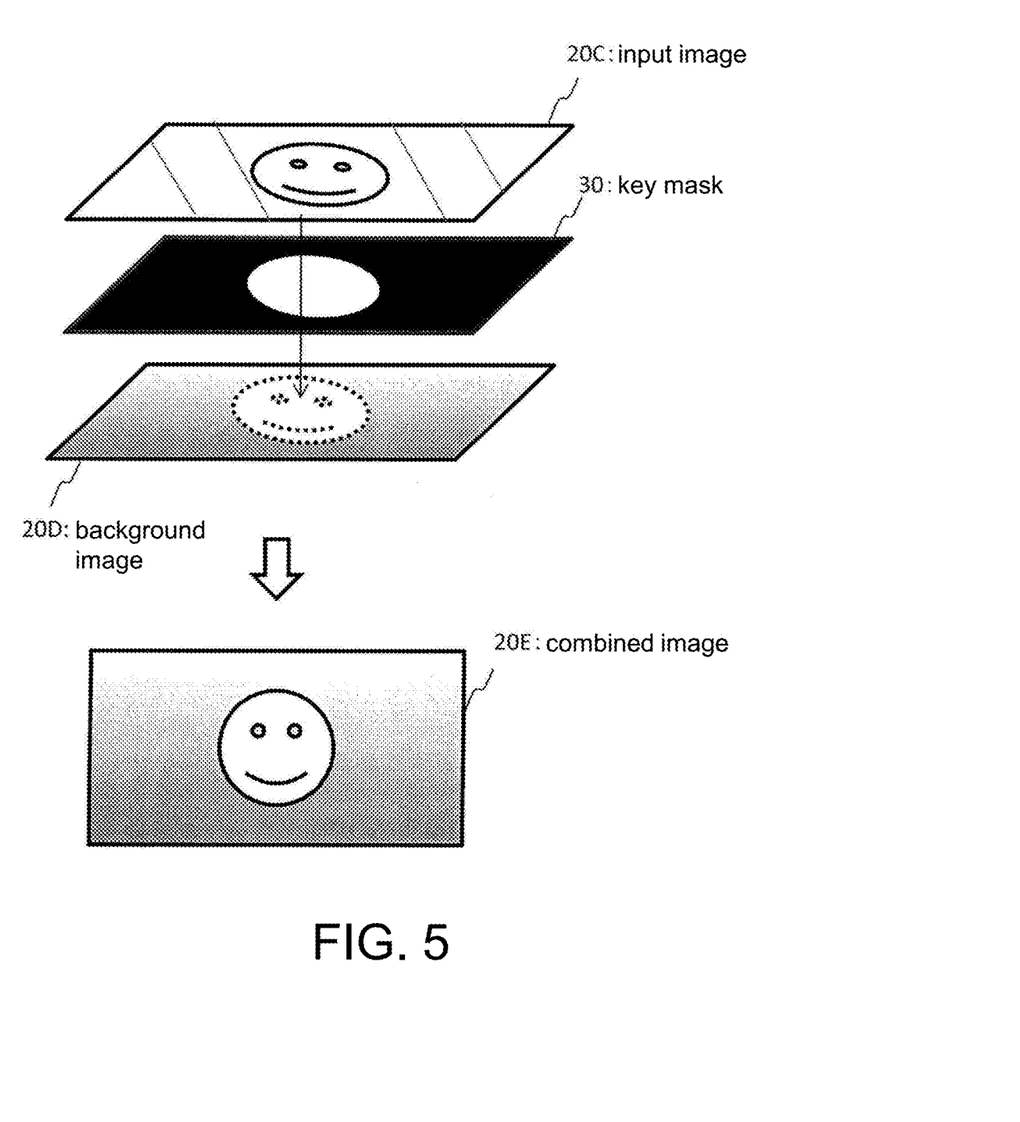
FIG. 5 is an explanatory diagram illustrating difference key combination.

The processor 101 performs a combination process (key combination) using the input image 20C, the key mask 30, and the background image 20D. FIG. 5 is an explanatory diagram illustrating difference key combination. The key mask 30 has the same number of pixels as the input image 20C and the background image 20D. Values of the pixels of a portion extracted (picked) from the input image 20C is set to "1" (255 in the case of the resolution of 0 to 255) and values of the other pixels are set to "0." In a drawing process for the difference combined image 20E, the pixel values of the input image 20C are used as the pixels of which the values are "1" in the key mask 30 and the pixel values of the background image 20D are used as the pixels of which the values are "0" in the key mask 30. Thus, the difference combined image 20E in which the image of the foreground subject (the person 11) of the input image 20C is superimposed on (in front of) the background image 20D is obtained (see FIGS. 4(B) and 5).

Operation Example

FIGS. 6 to 9 are flowcharts illustrating processing examples in the information processing apparatus 100. As the premise of the process, the user of the information processing apparatus 100 disposes the information processing apparatus 100 (the camera 111) to be fixed at a predetermined position and is located in front of the background so that the user is shown as a foreground subject in a visual field of the camera 111. In S01, the camera image 20A is captured. That is, the user operates the operation part 106 to turn the camera 111 (its image sensor) on. Then, data of the camera image 20A is input from the camera 111 to the camera input part 104 to be loaded in the RAM of the main storage device 102. A video based on the data of the camera image 20A is displayed on the display 112 by the video control part 105.

Figure 6:
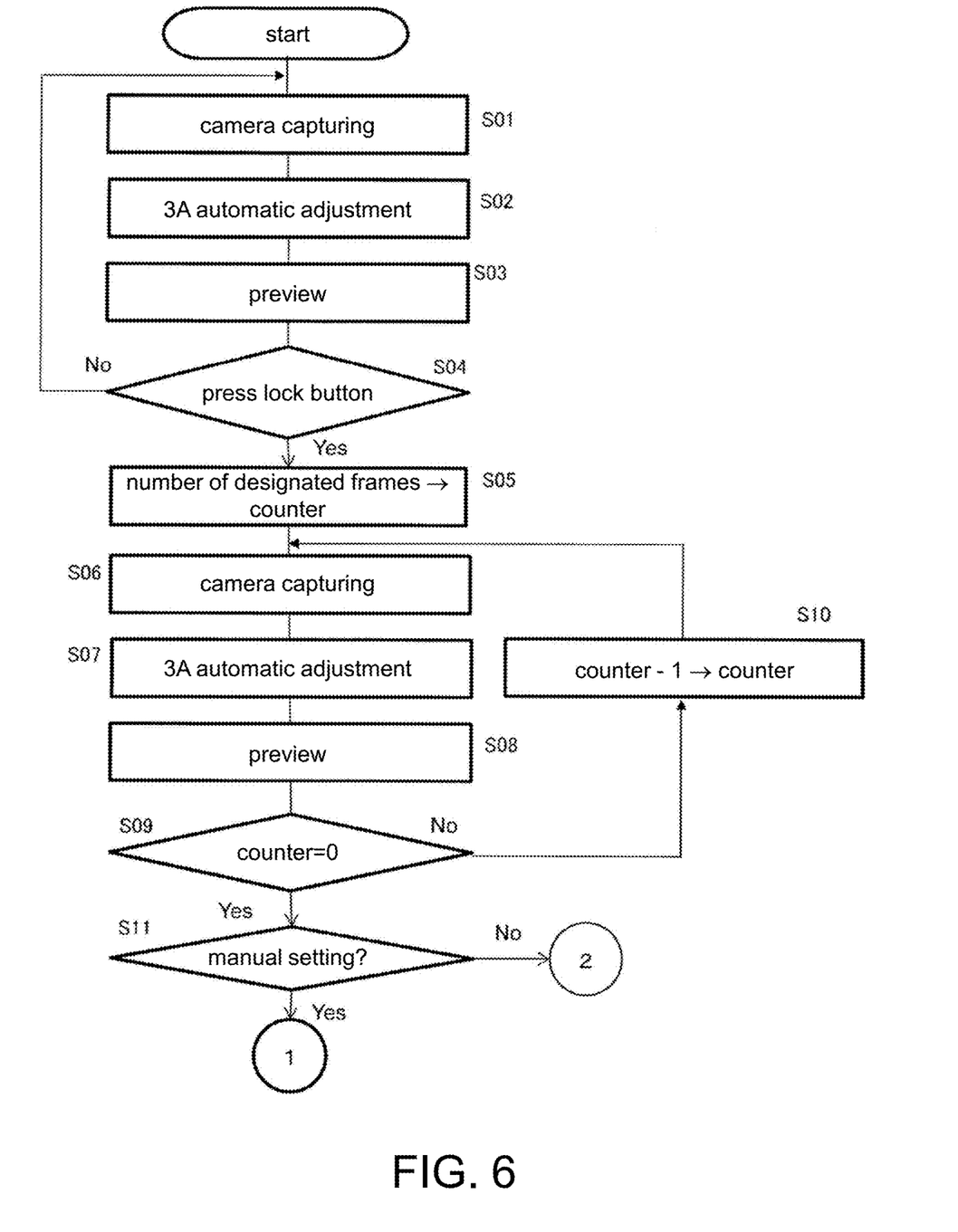
FIG. 6 is a flowchart illustrating a processing example in the information processing apparatus.

The processor 101 performs the 3A processes, that is, the AE, AF, and AWB processes (S02). The video control part 105 displays the camera image 20A subjected to the 3A processes on the display 112 (S03). The user can view the camera image 20A displayed on the display 112 as a preview screen.

When the user determines that a photographic composition of the user is optimum and appropriate through the 3A processes with reference to a preview screen, the user operates the operation part 106 or the remote controller 114 to lock (fix) the AE value, the AF value, and the AWB value. In the operation example, a case in which the remote controller 114 is used will be described as an example. Here, use of the remote controller 114 is optional and an operation and display performed using the remote controller 114 can be performed using the operation part 106 and the display part 107.

Figure 10:
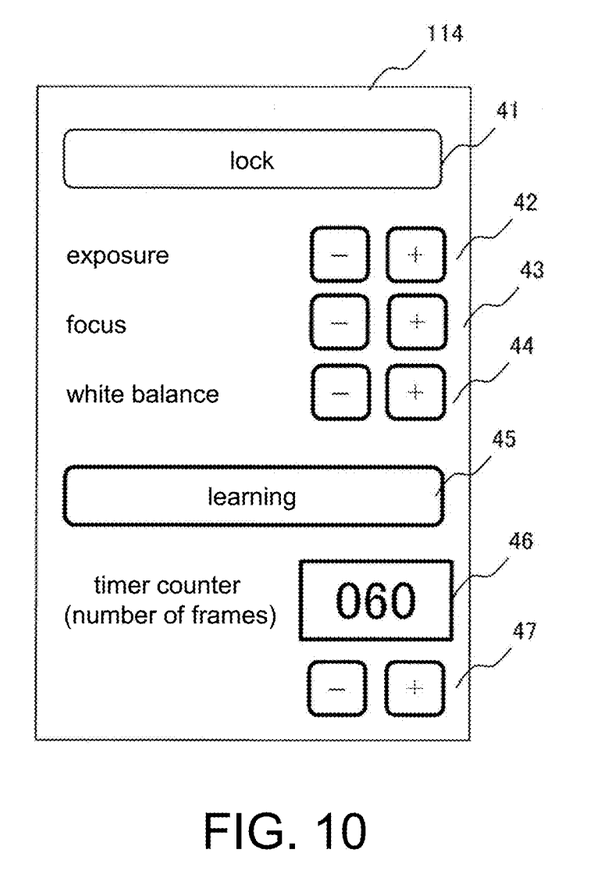
FIG. 10 is a diagram illustrating a configuration example of a remote controller.

FIG. 10 is a diagram illustrating a configuration example of the remote controller 114. In FIG. 10, the remote controller 114 includes a lock button 41, an exposure adjustment button 42, a focus adjustment button 43, and a white balance adjustment button 44. Each of the adjustment buttons 42, 43, and 44 is a combination of a plus button for increasing a value and a minus button for decreasing a value.

Further, the remote controller 114 includes a display part 46 of a timer counter value and a setting button 47 for a counter value. The setting button 47 is also a combination of a plus button and a minus button. The remote controller 114 contains a processor and a communication module. The processor contained in the remote controller 113 transmits a command signal to the information processing apparatus 100 in response to an operation on each of the foregoing buttons using the communication module. The command signal is received by the communication part 109 of the information processing apparatus 100. An appropriate communication standard such as a wireless or infrared communication standard can be applied as a communication scheme of the remote controller 114 and the information processing apparatus 100. A command received by the communication part 109 is delivered from the communication part 109 to the processor 101, and then the processor 101 performs a process in accordance with the command.

Referring back to FIG. 6, when the processor 101 waits for the user to press the lock button 41 of the remote controller 114 and detects the pressing (Yes in S04), the processor 101 transmits an instruction to set the number of designated frames from the communication part 109 to the remote controller 114. The remote controller 114 performs counting down the number of designated frames as the contained processor receives the instruction to set the number of designated frames and causes the display part 46 to display the number of designated frames as a timer value. The remote controller 114 may autonomously count down the number of designated frames in conformity with a frame rate and a decrement command issued for each frame by the processor 101 may be received from the information processing apparatus 100. The counter value can be increased or decreased using the setting button 47. The counter value may be displayed on the display part 107 or a count value displayed on the display part 107 may be changed in synchronization with a count value displayed on the display part 46 in response to an operation of the setting button 47. The pressing of the lock button 41 is equivalent to an instruction (an input) to acquire the fixed values.

Figure 7:
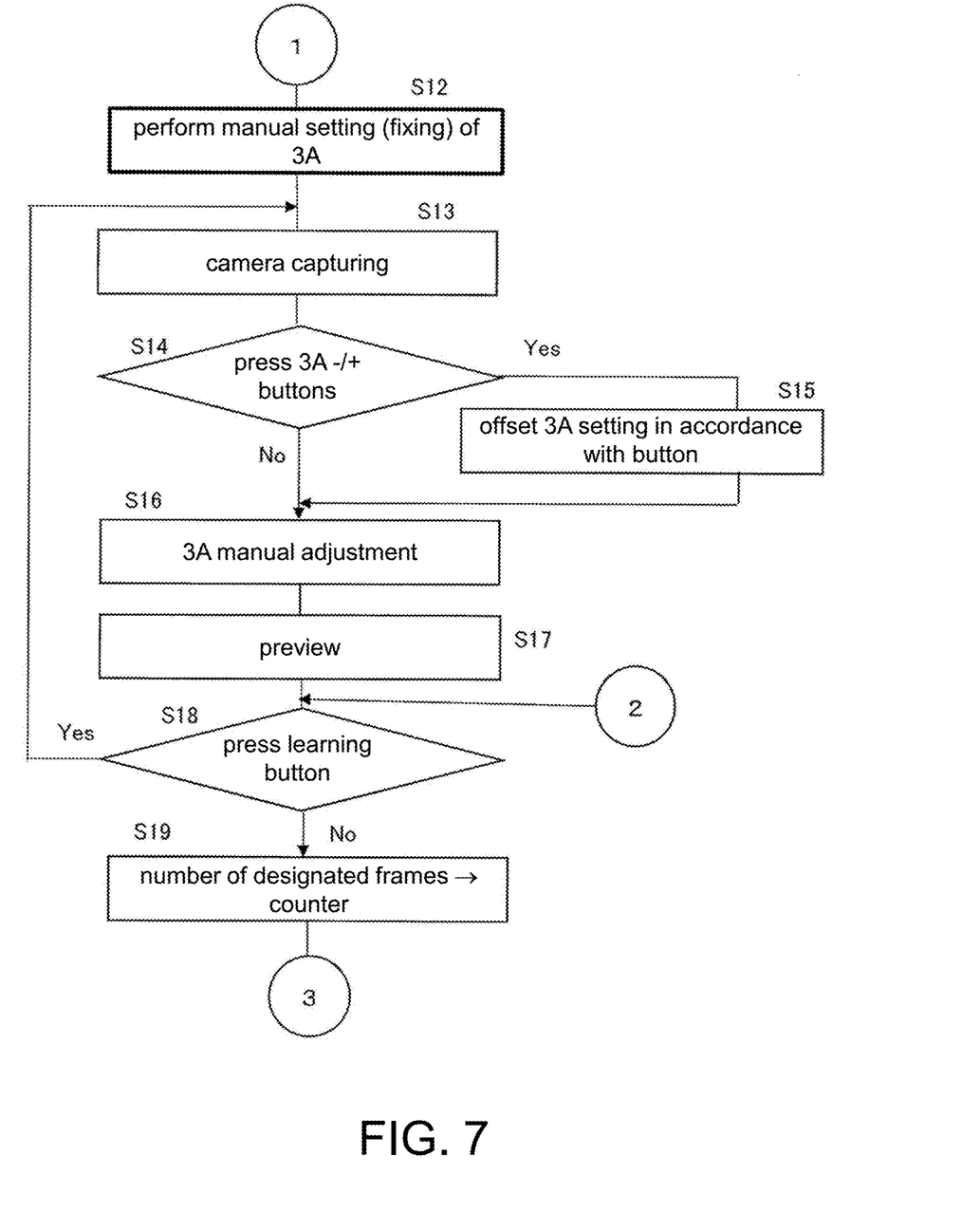
FIG. 7 is a flowchart illustrating a processing example in the information processing apparatus.

During the number of designated frames, that is, while the counter value is counted down to 0 (Yes in S09), the information processing apparatus 100 repeats similar processes to the processes from S01 to S03 (S06 to S08). In S11, the processor 101 determines whether at least one of the AE value, the AF value, and the AWB value is manually set. This determination can be performed, for example, by referring to a configuration information (stored in advance in the storage device) indicating ON or OFF of the manual setting.

In the case of a state (OFF) in which the manual setting is not performed, the processor 101 acquires the AE value, the AF value, and the AWB value at a time point at which the counter value is 0 as the fixed values and stores the fixed values in the storage device. Then, the process proceeds to S18. In this way, after the instruction to acquire the fixed values is carried out (the lock button 41 is pressed), the values at the time point at which the AE, AF, and AWB processes are performed for the predetermined time (a time point at which the counter value is 0) are acquired as the fixed values. Conversely, in the case of a state (ON) in which the manual setting is performed, the process proceeds to S12. The manual setting is optional.

In S12, the processor 101 starts the manual setting process. In S13, the camera image 20A is captured. The user can operate the 3A/+ buttons (the adjustment buttons 42, 43, and 44) to increase or decrease at least one of the AE value, the AF value, and the AWB value while referring to the preview screen (S14). When one of the adjustment buttons 42, 43, and 44 is operated, the processor 101 increases or decreases an offset value of the AE value, the AF value, and the AWB value in accordance with the pressed button (S15). In S16, the AE value, the AF value, or the AWB value is updated in response to the operation on the adjustment button 42, 43, or 44 and the result is reflected in the camera image 20A of the preview screen (S17).

Figure 8:
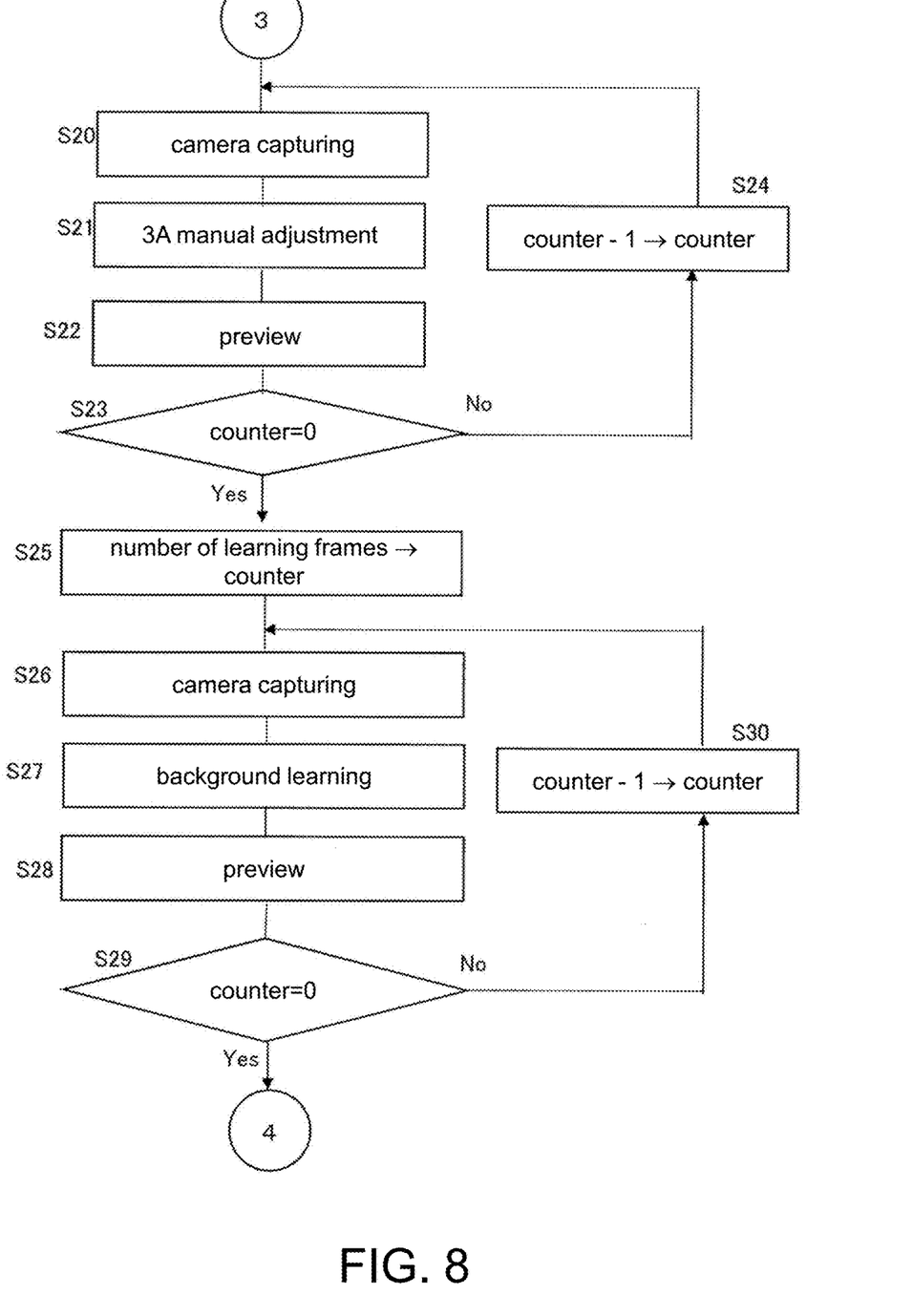
FIG. 8 is a flowchart illustrating a processing example in the information processing apparatus.

In S18, the processor 101 determines whether a learning button 45 of the remote controller 114 is pressed. When the learning button 45 is pressed, a command to generate the background learning data is transmitted from the remote controller 114 to the information processing apparatus 100 to be acquired by the processor 101. In this case, the AE value, the AF value, and the AWB value at this time point are set as the fixed values and are stored in the storage device, and then the process proceeds to S19. Conversely, when it is determined in S18 that the learning button is not pressed, the processes of S13 to S17 are repeated until a state in which the user considers the camera image 20A to be optimum.

When the user determines that the photographic composition of the foreground (for example, the user) is optimum in the camera image 20A displayed on the preview screen, the foreground is moved to a position at which the foreground is outside from the imaging visual field of the camera 111 (a position at which the foreground is not imaged by the camera 111) and the learning button 45 is pressed. Then, in S19, the processor receiving the command to generate the background learning data sets the number of designated frames to the counter value. The number of designated frames is transmitted to the remote controller 114 to be displayed on the display part 46.

Thereafter, processes of S20 to S23 are performed on a background image in which the user is outside from the visual field. The fixed values obtained until the current process are used as the 3A values related to the capturing of the background image. Here, through an operation by the user, in S21, at least one of the AE value, the AF value, and the AWB value which are the fixed values can be adjusted manually (an operation of the remote controller 114) (the processor 101 can update the fixed values). The processes of S19 to S23 are optional. The user may not update the fixed values by not operating the 3A/+ buttons.

Figure 9:
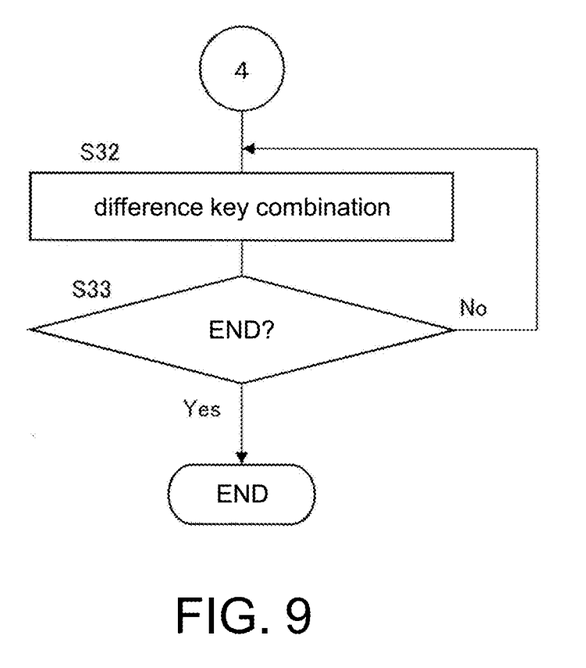
FIG. 9 is a flowchart illustrating a processing example in the information processing apparatus.

In S23, when the counter value is 0, the 3A values used to acquire the background learning data are fixed. In S25, the processor 101 sets the number of learning frames to a counter value of a predetermined number of learning frames. The number of learning frames is transmitted to the remote controller 114 to be displayed on the display part 46. Then, the number of learning frames starts to be counted down. A time clocked by the counting-down is used as a time for the user to evacuate a subject outside of the imaging visual field of the camera 111. The number of learning frames (that is, a time length) can be increased or decreased through an operation of the remote controller 114. Until the counter value is 0 by the counting-down of the number of learning frames (S30), the processor 101 generates the background learning data for the background image captured by the camera 111 in S26 (S27). The user can check the background image on a preview screen displayed on the display 112. When the counter value of the number of learning frames is 0 (Yes in S29), the generation of the background learning data ends and the background learning data is stored in the storage device.

Thereafter, a difference key combination process is performed in S32. The user enters himself or herself or another person as a subject or places an animal, a plant, or an object as a subject within the imaging visual field of the camera 111. At this time, an image captured with the camera 111 is supplied as the input image 20C to the processor 101. The processor 101 captures the input image 20C using the above-described fixed values (or the 3A values obtained by manually adjusting the fixed values in S21). The processor 101 performs processes of extracting the foreground image from the acquired input image 20C using the background learning data, generating the key mask 30, and storing the key mask 30 in the storage device.

On the other hand, the user operates the reproduction device 113 to perform a process of reproducing the predetermined background image 20D. Then, the data of the background image 20D is input to the video input part 108 to be delivered to the processor 101. The processor 101 instructs the video control part 105 to perform a combination process. Then, the video control part 105 generates data of a combined image in which the foreground image is displayed in front of the background image 20D using the key mask 30 and displays the combined image on the display 112. The processor 101 repeats the process of S32 until data indicating end is input from the user. The processor 101 may also perform the process performed by the video control part 105 without providing the video control part 105.

The information processing apparatus according to the embodiment optimizes exposure, focus, and white balance of a captured image in which a subject is in front of the background before the process of generating the background learning data and acquires (maintains) the fixed values of the 3A values. Thereafter, the background learning data 20B is generated, the input image 30C is acquired, and the difference image (the foreground image) is extracted using the fixed values or the 3A values obtained by manually adjusting the fixed values. Thus, it is possible to obtain the following.

A case in which the fixed values of the 3A values for a background image with no a foreground subject (a person, an animal, a plant, or an object) are obtained will be assumed. In this case, for exposure, focus, and white balance, the 3A values optimum in a state in which there is no foreground are maintained as the fixed values. The following problem arises when the fixed values are used to generate the background learning data 20B or acquire the input image 20C.

In a normal AE process, exposure is determined so that a white wall becomes gray. Therefore, for example, when a background is a white wall and fixing of an AE value suitable for the white wall, generation of the background learning data 20B, and acquisition of the input image 20C are performed, a problem arise in that the photographic composition of the foreground subject (the person 11) picked from the input image is darkened. In the embodiment, however, since the 3A values are fixed and used for generating the background learning data 20B and acquiring the input image 20C in a state in which there is the foreground subject, the foregoing problem does not arise.

When background learning is performed earlier so that a wall is in focus and there is a distance between the wall and the foreground subject (the picking target person 11), a problem may arise in that focus is not achieved and an edge remains at the time of key combination. In the embodiment, however, since the AF value is fixed in a state in which the foreground subject is in focus, the above-described problem does not arise.

Further, when background learning is performed earlier so that white balance is determined using the color of a wall as a reference and the color of the wall is biased to certain tone, a problem may arise in that the complexion of a foreground person is corrected and the complexion is worse. In the embodiment, however, since white balance is also determined in consideration of the tone of the foreground subject, the above-described problem does not arise. Accordingly, according to the embodiment, it is possible to obtain a difference key combined image with a small unnatural sense (good quality). The configurations described in the embodiment can be appropriately combined within the scope of the disclosure without departing from the objective of the disclosure.

What is claimed is:

1. An information processing method performed by an information processing apparatus, the method comprising:
    acquiring at least one fixed value which is an imaging condition of a first image formed in a state in which a background and a predetermined subject located in front of the background are within an imaging visual field, from the first image;
    acquiring a learning image as background learning data, wherein the learning image is captured using the at least one fixed value in a second image formed in a state in which the subject is outside of the imaging visual field;
    extracting a difference image between the background learning data and an input image obtained by capturing the first image using the at least one fixed value; and
    generating a combined image obtained by combining the difference image with a combination background image,
    wherein the at least one fixed value which is the imaging condition comprises an exposure value, an autofocus value, and a white balance value of the first image.

2. The information processing method according to claim 1, wherein the acquiring of the at least one fixed value comprises
    performing a process of maintaining brightness of the first image constantly and acquiring the exposure value,
    performing a process of adjusting a focus position of the first image and acquiring the autofocus value, and
    performing a process of approaching an average color in a screen of the first image to gray and acquiring the white balance value.

3. The image processing method according to claim 2, wherein the process of maintaining the brightness of the first image is an automatic exposure process.

4. The image processing method according to claim 2, wherein the process of adjusting the focus position of the first image is an autofocus process.

5. The image processing method according to claim 2, wherein the process of approaching the average color in the screen of the first image to gray is an auto-white balance process.

6. The information processing method according to claim 1, wherein the at least one fixed value is obtained through an automatic exposure process, an autofocus process, and an auto-white balance process in the first image.

7. The information processing method according to claim 6,
    wherein, an instruction to acquire the at least one fixed value is further carried out before the at least one fixed value is acquired,
    wherein, after an instruction to acquire the at least one fixed value is carried out, an exposure value, a focus value, and a white balance value at a time point at which the automatic exposure process, the autofocus process, and the auto-white balance process are performed for a predetermined time are acquired as the at least one fixed value.

8. The information processing method according to claim 1, comprising updating a value of at least one of the exposure value, the focus value, and the white balance value in the at least one fix value.

9. An information processing apparatus comprising a processor configured to perform:
   a process of acquiring at least one fixed value which is an imaging condition of a first image formed in a state in which a background and a predetermined subject are located in front of the background within an imaging visual field, from the first image;
   a process of acquiring a learning image as background learning data, wherein the learning image is captured using the at least one fixed value in a second image formed in a state in which the subject is outside of the imaging visual field;
   a process of extracting a difference image between the background learning data and an input image obtained by capturing the first image using the at least one fixed value; and
   a process of generating a combined image obtained by combining the difference image with a combination background image,
   wherein the at least one fixed value which is the imaging condition comprises an exposure value, an autofocus value, and a white balance value of the first image.

10. The information processing apparatus according to claim 9, comprising:
    a camera connected to the processor.

11. The information processing apparatus according to claim 9, comprising:
    an operation part which is an input device connected to the processor.

12. The information processing apparatus according to claim 9, comprising:
    a communication interface circuit connected to the processor; and
    a remote controller configured to be able to communicate with the communication part.

13. A non-transitory computer readable medium that stores a program causing a computer to perform a plurality of steps comprising:
    a step of acquiring at least one fixed value which is an imaging condition of a first image formed in a state in which a background and a predetermined subject located in front of the background are within an imaging visual field, from the first image;
    a step of acquiring a learning image as background learning data, wherein the learning image is captured using the at least one fixed value in a second image formed in a state in which the subject is outside of the imaging visual field;
    a step of extracting a difference image between the background learning data and an input image obtained by capturing the first image using the at least one fixed value; and
    a step of generating a combined image obtained by combining the difference image with a combination background image,
    wherein the at least one fixed value which is the imaging condition comprises an exposure value, an autofocus value, and a white balance value of the first image.

14. The non-transitory computer readable medium according to claim 13, wherein the step of acquiring the at least one fixed value comprises
    performing a process of maintaining brightness of the first image constantly and acquiring the exposure value,
    performing a process of adjusting a focus position of the first image and acquiring the autofocus value, and
    performing a process of approaching an average color in a screen of the first image to gray and acquiring the white balance value.

15. The non-transitory computer readable medium according to claim 14, wherein the process of maintaining the brightness of the first image is an automatic exposure process.

16. The non-transitory computer readable medium according to claim 14, wherein the process of adjusting the focus position of the first image is an autofocus process.

17. The non-transitory computer readable medium according to claim 14, wherein the process of approaching the average color in the screen of the first image to gray is an auto-white balance process.

* * * * *